United States Patent [19]

Nishi

[11] Patent Number: 4,584,835
[45] Date of Patent: Apr. 29, 1986

[54] BLADE FASTENING STRUCTURE FOR TORQUE CONVERTER OR FLUID COUPLING

[75] Inventor: Tetsuro Nishi, Osaka, Japan

[73] Assignee: Kabushiki Kaisha Daikin Seisakusho, Osaka, Japan

[21] Appl. No.: 654,522

[22] Filed: Sep. 25, 1984

Related U.S. Application Data

[62] Division of Ser. No. 522,581, Aug. 12, 1983, abandoned.

[30] Foreign Application Priority Data

Aug. 12, 1982 [JP] Japan ................... 57-122659

[51] Int. Cl.⁴ ........................... F16D 33/00
[52] U.S. Cl. .................. 60/330; 29/156.8 FC; 416/180
[58] Field of Search .............. 416/180; 29/156.8 FC, 29/156.8 CF; 60/330, 331, 347, 357

[56] References Cited

U.S. PATENT DOCUMENTS

| | | | |
|---|---|---|---|
| 2,061,997 | 11/1936 | Dunn | 416/180 |
| 2,328,393 | 8/1943 | Neracher et al. | 29/156.8 FC |
| 2,436,911 | 3/1948 | Zeidler | 416/180 |
| 2,474,298 | 6/1949 | Zeidler | 416/180 |
| 2,599,461 | 6/1952 | Koskinen | 416/180 |
| 2,692,562 | 10/1954 | Zeidler | 416/180 |
| 2,752,859 | 7/1956 | Zeidler | 29/156.8 FC |
| 2,890,661 | 6/1959 | Egbert | 416/180 |
| 3,817,656 | 6/1974 | Batteux | 416/180 |

Primary Examiner—Edward K. Look
Attorney, Agent, or Firm—Armstrong, Nikaido Marmelstein & Kubovcik

[57] ABSTRACT

A blade fastening structure for a torque converter or a fluid coupling forming a caulking part previously at an inner peripheral portion of an impeller, and fastening an inner peripheral portion of a blade to a shell by caulking the caulking part; in a torque converter or a fluid coupling forming the shell by welding an inner peripheral portion of a shell body having an annular groove of semi-circular section to a hub concentric with an output shaft, and forming the impeller by arranging a semi-elliptic blade between the shell and a core ring.

4 Claims, 11 Drawing Figures

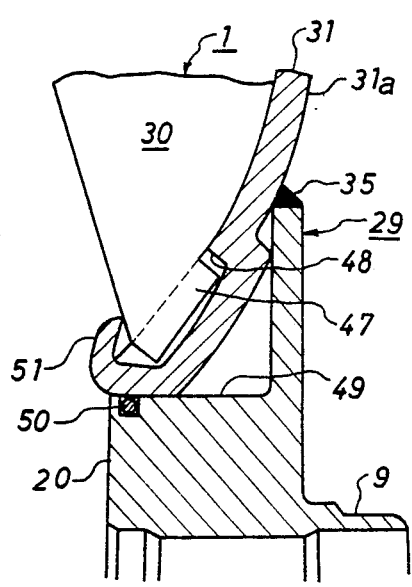
FIG. 8
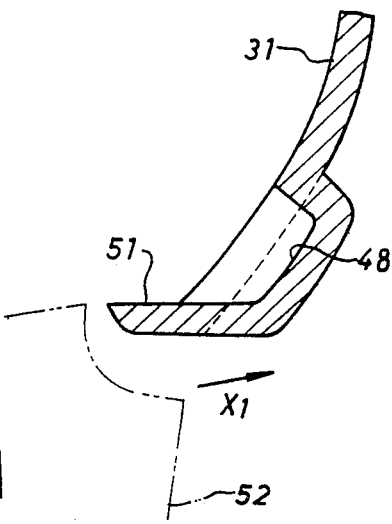
FIG. 9
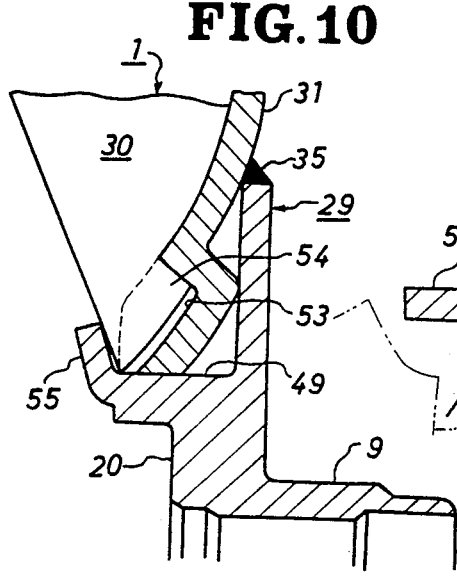
FIG. 10
FIG. 11

BLADE FASTENING STRUCTURE FOR TORQUE CONVERTER OR FLUID COUPLING

This application is a division, of application Ser. No. 522,581, filed Aug. 12, 1983 now abandoned.

FIELD OF THE INVENTION

This invention relates to an impeller of sheet metal construction for use in a torque converter or a fluid coupling.

In a three-element one-stage torque converter shown in FIG. 1, for example, an impeller 1 is interconnected through a housing 2 to an input shaft 3, a turbine blade 4 is interconnected to an output shaft 5, and a stator blade 6 is supported by a stator hollow shaft 8 through a one-way clutch 7. Incidentally, a hub 9 is provided to an inner peripheral portion of the impeller 1, and a gear pump 10 is deviced as to be driven by the hub 9.

In this instance, a structure as shown in FIG. 2 has been known as that for fastening a blade 12 to a shell 21 of the impeller 1. In FIG. 2, projected portions 14, 15 are provided at an end (peripheral portion) of an external edge 13 of the blade 12 opposite to an axis R of rotation and at a central portion respectively, and the projected portions 14, 15 fit into recessed portions 17, 18 provided on a shell inner surface 16. A recessed portion 19 extending annularly in rotational direction is formed on an inner peripheral side (near to the axis R of rotation) of the shell inner surface 16, an outward flange 20 of the hub 9 is welded to an inner peripheral end of a shell body 11 thus the shell body 11 and the hub 9 forming the shell 21. Further, a retainer ring 22 is disposed along the above-mentioned recessed portion 19, and an inner peripheral portion of the retainer ring 22 is welded to an outer peripheral edge of the flange 20. Plural tapered notches 23 (FIG. 3) are provided on an outer peripheral portion of the retainer ring 22, a projected part 24 formed on an inner peripheral portion of each blade 12 is press fitted into a corresponding notch 23, thus the blade 12 being securely fastened to the shell. Incidentally, 24' is a core ring which fits onto a projected portion formed on an inner peripheral edge 25 of the blade 12.

According to the above-mentioned conventional construction, however, due to the design in which the inner peripheral portion of the blade 12 is merely press fitted into the notch 23 of the retainer ring 22, a durability perticularly at a low speed ratio (speed at output side/speed at input side) is doubtful and troubles have occured such as looseness of the blade 12 and slipping off of the blade from the retainer ring 22.

Further, a structure as shown in FIG. 4 is known as a conventional one; in which a projected part 28 of the blade 12 is fitted into a recessed portion 27 provided on an inner periphery of the shell body 11, the recessed portion 27 is caulked and collapsed by means of punch 28' etc., thus the blade 12 being securely fastened.

In this structure, however, due to the caulking such as thinning a thickness of the shell body 11 by means of the punch 28' etc., there are disadvantages not only that strength of the shell body 11 is weakened due to thinning of its thickness, but that fastening strength of the caulking can not be stabilized.

SUMMARY OF THE INVENTION

An object of this invention is to provide a blade fastening structure for a torque converter or a fluid coupling, in consideration of the above-mentioned troubles, which permits prevention of troubles such as loosening and sliping off of the blade by firmly fastening the blade to the shell, eliminates the possibility of decreasing the strength of shell due to thinning of its thickness, and provides simple composition.

In order to accomplish the above object according to this invention; in a torque converter or a fluid coupling forming a shell by welding an inner peripheral portion of a shell body having an annular groove of semicircular section to a hub concentric with an output shaft and forming an impeller by arranging a semielliptic blade between the shell and a core ring; a caulking part is previously formed on an inner peripheral portion of the impeller, and a inner peripheral portion of the blade is fastened to the shell by caulking the caulking part.

BRIEF DESCRIPTION OF THE DRAWINGS

FIG. 8 is a partially vertical sectional side view of a second embodiment, FIG. 9 is a vertical sectional side view of a shell body of the second embodiment, FIG. 10 is a partially vertical sectional side view of a third embodiment, and FIG. 11 is a partially vertical sectional side view of a hub of the third embodiment.

DETAILED DESCRIPTION OF THE INVENTION (First embodiment)

Figure 5:
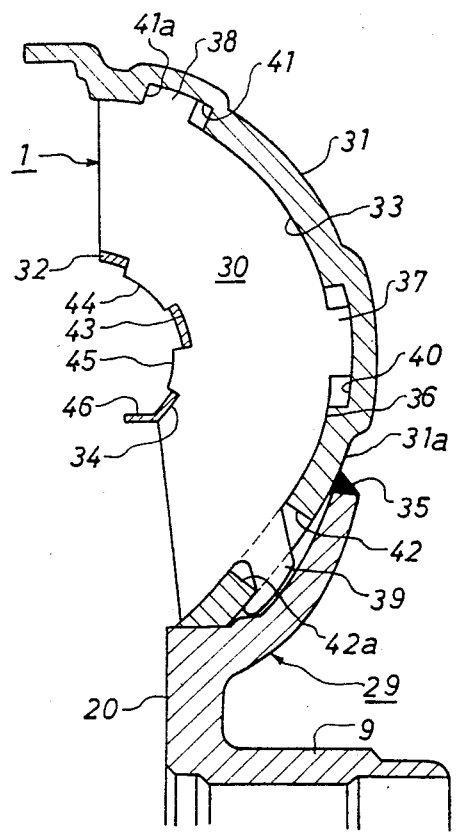
FIG. 5 is a partially vertical sectional side view of a first embodiment of a blade fastening construction according to this invention.

In FIG. 5; a blade 30, a shell body 31 and a core ring 32 of an impeller 1 are all press formed products made of steel plate. The shell body 31 has a concave surface (inner surface) 33 which forms an annular groove, the core ring 32 has a convex surface 34 facing at the shell body 31, and a plurality of semi-elliptic blade 30 is disposed between them. Further an outer peripheral edge of a flange 20 of a hub 9 driving a gear pump (FIG. 1) is fixed by welding to an inner peripheral portion of the shell body 31, and a shell 29 is formed by the shell body 31 together with the hub 9. This welded part 35 is uniformly formed with liquid tightness kept around the entire circle.

Figure 6:
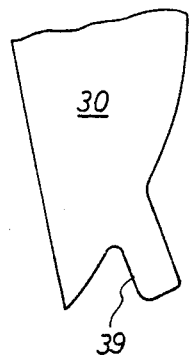
FIG. 6 is a partial side view of the blade of the first embodiment.

The blade 30 integrally has approximately rectangular projected portions 37, 38, 39 at about central part, an outer peripheral portion (upper side in the figure), and an inside edge of an outside edge 36, respectively. Among them, the projected portion 39 (caulked part) is projecting to a larger extent than other projected portions 37, 38 do, and its shape is a tongue-form projected shape before the blade is installed as shown in FIG. 6. Under the installed condition as illustrated in FIG. 5, the projected portions 37, 38 fit into approximately correspondingly shaped recessed portions 40, 41 provided on a concave surface 33 of the shell body 31 with plays preserved in the direction along the outside edge 36. Moreover, the projected portion 39 goes through a slit 42 provided on the inner peripheral portion of the shell body 31, and a part projecting to the side of a convex surface 31a (outer surface) of the shell body 31 is folded down to permit fastening of the blade. While, projected portions 44, 45 are provided also on an inside edge 43 of the blade 30, these projected portions 44, 45 pass through slits provided at corresponding positions of the core ring 32 and folded down on a concave surface 46 (inner surface) of the ring 32.

Figure 7:
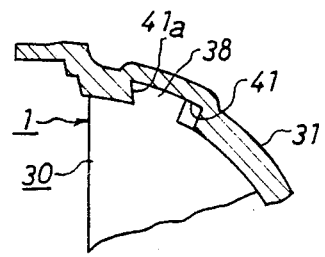
FIG. 7 is a partially vertical sectional side view of an outer peripheral portion of an impeller.

When the blade 30 is assembled in the shell body 31, first the projected portions 37, 38 are fitted in the corresponding recessed portions 40, 41 with plays preserved in the direction approximately along the outside edge 36, then the projected portion 39 is forcedly fitted in the slit 42 and the tip end of the projected portion 39 is folded down. It goes without saying that the hub 9 should be welded to the shell body 31 only after the above works have been completed. Incidentally, since the blade 30 is deformedly installed when the blade 30 is assembled in the shell body 31, the projected portion 39 contacts against an inner peripheral side end face 42a of the slit 42 to make the blade 30 exert an outer peripheral force along the outside edge 36, by this force the projected portion 38 is pressed against an edge 41a of the recessed portion 41 to securely fix the blade 30 in both the rotational and radial directions. In this instance, if the edge 41a and a corresponding end face of the projected portion 38 are so formed as to encroach each other as shown in FIG. 7, a fastening strength of the blade 30 can be improved further.

(Second embodiment)

Differing portion of the second embodiment from the first embodiment is an innner peripheral part of the impeller as shown in FIG. 8. In FIG. 8, a projected portion 47 formed integrally with an inner peripheral end portion of the blade 30 has an approximately same shape with those of other projected portions 37, 38 (FIG. 5), and fits in a recessed portion 48 formed on the inner peripheral part of the shell body 31. A shouldered part 49 of the outward flange 20 of the hub 9 fits in an inner peripheral end portion of the shell body 31, an outer peripheral edge of the flange 20 is securely fixed by welding to an outside surface 31a of the shell body 31, and the shell body 31 together with the hub 9 form the shell 29. A circular welding part 35 is uniformly formed with liquid-tightness kept around the entire circle. In this case, however, an O-ring 50 may be provided between the shouldered part 49 and an inner peripheral edge of the shell body 31 to assist sealing property of the welding part 35. Further a collar 51 (caulked part) extending annularly in the rotating direction is formed integrally with an inner peripheral end of the shell body 31 (FIG. 9), and the blade 30 is caulked and fastened with the tip end of the collar 51 as shown in FIG. 8 by forcibly bending the collar 51 in the direction of the arrow X$_1$ using a press machine 52 etc. In this state before caulking and fastening, if a play permitting movement along the convex surface 34 of the ring 32 in the direction of the outer periphery of the impeller 1 is provided at a fitting portion of the blade 30 and the ring 32 in relation to the core ring 32 (FIG. 5), an effect of caulking can be improved further.

In FIG. 8, it is not necessary to form the collar 51 around the entire circle, but only a portion corresponding to the recessed portion 48 may be projected.

(Third embodiment)

As shown in FIG. 10, at an inner periphery of the impeller 1 a recessed portion 53 formed at an inner peripheral end of the shell body 31 has a shape opening to the center of the impeller 1, and a projected part 54 formed at the inner peripheral part of the blade 30 fits therein. Further, the inner peripheral edge of the shell body 31 fits into a shouldered part 49 of the flange 20 of the hub 9, and an outer peripheral edge of the flange 20 is welded at the welding part 35 with liquid-tightness kept around it. While, an annular collar 55 (caulked part) concentric with the impeller 1 is formed integrally with the flange 20 (FIG. 11), and the blade 30 is caulked and fastened by forcibly bending the collar 55 in the direction of the arrow X$_2$ using a press machine etc. Also in this case, it is not necessary to form the collar 55 around the entire circle, and the collar 55 may be formed only at a portion corresponding to the recessed portion 53.

As described above, since the caulked parts (the projected portion 37, 54 the collar 51, 55) have previously been formed at the inner perpheral part of the impeller 1 to permit the inner peripheral part of the blade 30 to be fastened to the shell 29 by caulking the caulked part, the present invention has such advantages that the blade 30 can be fully securely fastened to the shell 29, troubles of the blade 30 such as looseness, slipping-off etc. can certainly be prevented, possibility of insufficiency in strength of the shell due to thinning of its thickness is eliminated, and the construction becomes simple to save manufacturing cost thereof.

Figure 1:
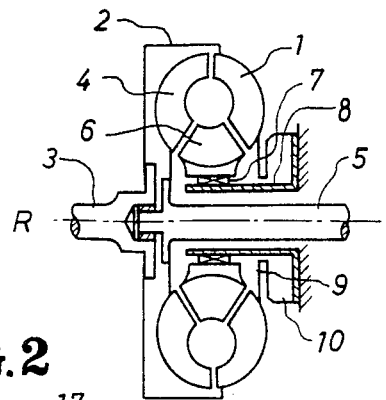
FIG. 1 is a schematic vertical section side view of a three-element one-stage torque converter.
Figure 2:
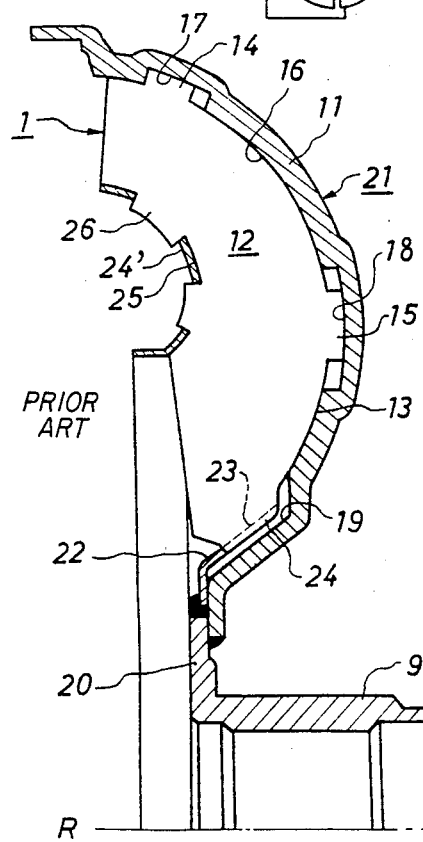
FIG. 2 is a partially vertical sectional side view of a conventional embodiment.
Figure 4:
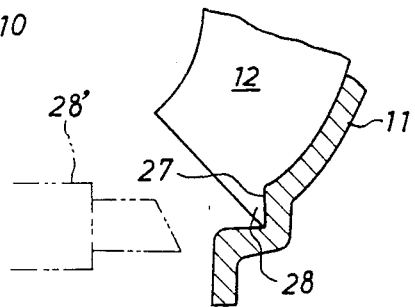
FIG. 4 is another partially vertical sectional side view of a conventional embodiment.
Figure 3:
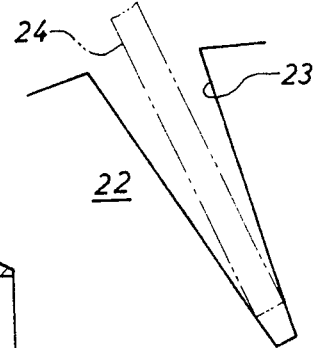
FIG. 3 is an enlarged view showing a notch of a conventional embodiment.

Incidentally, this invention is applicable not only to the impeller 1 but similarly to the turbine blade 4 (FIG. 1). Since it is not necessary to provide the welding part 35 with liquid-tightness in this case, advantages are available that welding position at the side of the shell body 31 can be set at further inner peripheral side, welding work becomes easy, and at the same time the flange 20 can be reduced in size.

What is claimed is:

1. A blade fastening structure for a torque converter or fluid coupling, said torque converter or fluid coupling have a shell formed of a shell body having an annular concave inner surface and welded at an inner peripheral portion of said shell body to a hub concentric with an output shaft, and a plurality of semi-elliptic impeller blades annularly disposed between said inner surface of said shell and a core ring and fastened to said shell, the blade fastening structure comprising a plurality of radial recesses formed annularly in said inner peripheral portion of said shell body, projections formed integrally with said impeller blades at their inner peripheral end portions and fitted in said recesses, and an annular collar portion at the inner peripheral end of said impeller blades, said collar having a plurality of individual extensions formed integrally with said shell body and arranged annularly at locations corresponding to said recesses in said shell body and being bent over against an inner peripheral edge of said impeller blades for engaging said projections of said impeller blades with said recesses in said shell body and caulking said impeller blades to said concave inner surface of said shell body.

2. A blade fastening structure according to claim 1, further comprising an O-ring disposed annularly in sealing relation between said inner peripheral portion of said shell body and said hub.

3. A blade fastening structure according to claim 1 wherein said core ring has a convex surface engaged by an inner peripheral portion of said impeller blades with play provided therebetween such that said impeller blades may move along said convex outer surface of said core ring in a direction along an outer peripheral surface of said impeller blades as said collar is bent over, whereby caulking of said impeller blades to said inner surface of said shell body is further improved.

4. A blade fastening structure according to claim 1, wherein said core ring has a convex surface engaged by an inner peripheral portion of said impeller blades.

* * * * *